United States Patent
Evans

Patent Number: 5,180,037
Date of Patent: Jan. 19, 1993

[54] DRUM-IN-HAT PARKING BRAKE FOR A DISC BRAKE ASSEMBLY

[75] Inventor: Anthony C. Evans, Northville, Mich.

[73] Assignee: Kelsey-Hayes Company, Romulus, Mich.

[21] Appl. No.: 668,370

[22] Filed: Mar. 26, 1991

Related U.S. Application Data

[63] Continuation of Ser. No. 400,218, Aug. 29, 1989, abandoned.

[51] Int. Cl.⁵ .............................................. F16D 63/00
[52] U.S. Cl. .................................. 188/70 R; 188/2 D; 188/106 A; 188/106 F; 188/205 R; 188/325; 188/331; 188/341; 74/105; 74/471 R
[58] Field of Search ............... 188/2 D, 70 R, 70 B, 188/106 F, 106 A, 325-341, 205, 206, 71.1, 73.43-73.45, 78, 361, 362, 79.51, 196 R, 196 BA, 196 B, 196 D, 218 A, 218 R; 192/99 B, 75; 74/105, 471 R

[56] References Cited

U.S. PATENT DOCUMENTS

| | | | |
|---|---|---|---|
| 1,186,743 | 6/1916 | Brush | 188/336 |
| 1,490,639 | 4/1924 | Schaeffer | 188/337 X |
| 1,536,640 | 5/1925 | Vanderbeek | 188/336 |
| 1,726,712 | 9/1929 | Newcomb et al. | 188/336 |
| 1,871,260 | 8/1932 | Delahaye | 188/106 A X |
| 1,913,156 | 6/1933 | Frehse | |
| 1,940,022 | 12/1933 | Schnell | 188/106 A |
| 1,990,971 | 2/1935 | Apple | 188/106 A X |
| 1,994,823 | 3/1935 | Kohr | 188/331 |
| 1,996,235 | 4/1935 | Dodge | 188/327 |
| 2,009,100 | 7/1935 | Taylor | 188/325 X |
| 2,036,385 | 4/1936 | Amirault | 188/325 |
| 2,066,308 | 12/1936 | Pomeroy et al. | 188/337 X |
| 2,081,588 | 5/1937 | Brie | |
| 2,118,188 | 5/1938 | Gallup | 188/331 X |
| 2,131,369 | 9/1938 | Brisson | 188/106 A X |
| 2,161,640 | 6/1939 | Schnell | 188/327 |
| 2,259,266 | 10/1941 | Rabe | 188/327 X |
| 2,287,239 | 6/1942 | Goepfrich | 188/328 |
| 2,503,489 | 4/1950 | James, Jr. | 188/106 A X |
| 2,657,768 | 11/1953 | Hunyady | 188/331 |
| 2,945,564 | 7/1960 | House et al. | 188/106 A X |
| 3,023,853 | 3/1962 | Nawrot | 188/106 A X |
| 3,811,537 | 5/1974 | Margetts | 188/106 A X |
| 3,850,266 | 11/1974 | Hesskamp et al. | 188/332 X |
| 3,870,131 | 3/1975 | Firth et al. | 188/325 |
| 3,934,684 | 1/1976 | Evans | 188/196 D X |
| 4,018,312 | 4/1977 | Muramoto et al. | 188/325 X |
| 4,757,882 | 7/1988 | Idesawa | 188/328 X |
| 4,800,993 | 1/1989 | Weber | 188/106 F X |
| 4,844,212 | 7/1989 | Rodino et al. | 188/331 X |
| 4,854,423 | 8/1989 | Evans et al. | 188/218 A X |
| 4,887,698 | 12/1989 | Hunt et al. | 188/325 |

FOREIGN PATENT DOCUMENTS 3012137 10/1980 Fed. Rep. of Germany.
387810 2/1933 United Kingdom ............... 188/337

Primary Examiner—Douglas C. Butler
Attorney, Agent, or Firm—MacMillan, Sobanski & Todd

[57] ABSTRACT

For a vehicle having a relatively large axle tube, a mechanically operated drum brake is provided having a hollow abutment post between adjacent ends of a pair of opposed arcuate brake shoes and having an improved actuating mechanism for the brake shoes mounted partially within the abutment post.

12 Claims, 9 Drawing Sheets

DRUM-IN-HAT PARKING BRAKE FOR A DISC BRAKE ASSEMBLY

CROSS-REFERENCE TO RELATED APPLICATION

This application is a continuation of U.S. Pat. Ser. No. 07/400,218, filed Aug. 29, 1989, now abandoned.

BACKGROUND OF THE INVENTION

This invention relates to an actuating mechanism for a drum-in-hat parking brake associated with a disc brake rotor for a heavy truck disc brake assembly.

The large axle tube on a heavy truck takes up so much space inside the hat of a disc brake that before my invention it was not feasible to incorporate a drum-in-hat parking brake in the hat of the disc brake rotor. Formerly, either the parking brake was placed on the drive shaft of the truck behind the transmission, or the hydraulically operated caliper of the disc brake was provided with mechanically operated means whereby the caliper could also serve as the parking brake. The latter arrangement is shown in my earlier U.S. Pat. No. 3,934,684, issued Jan. 27, 1976.

SUMMARY OF THE INVENTION

In accordance with my invention, a drum-in-hat parking brake mechanism is provided in the limited space between the large axle tube of a heavy truck and the hat of a disc brake rotor. This is accomplished through the provision of an improved mechanical actuating mechanism and the novel mounting arrangement thereof, as shown in the accompanying drawings.

DETAILED DESCRIPTION OF THE PREFERRED EMBODIMENT

Figures 1, 1A:
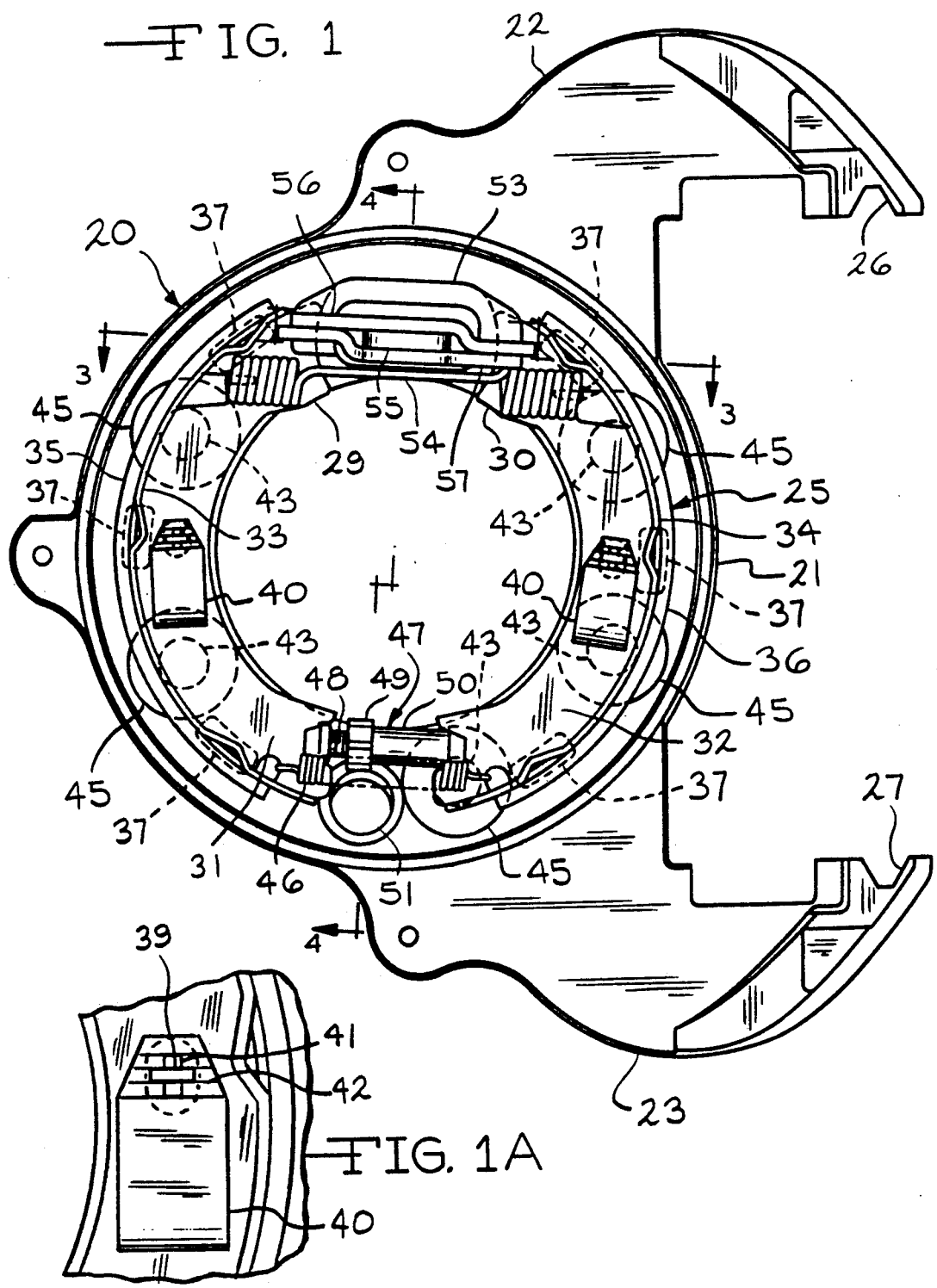
FIG. 1 is an outboard view of a support casting having a drum-in-hat parking brake constructed in accordance with the invention mounted thereon.
FIG. 1A is an enlarged view of a fastening clip for a right-hand brake shoe of FIG. 1.
Figure 4:
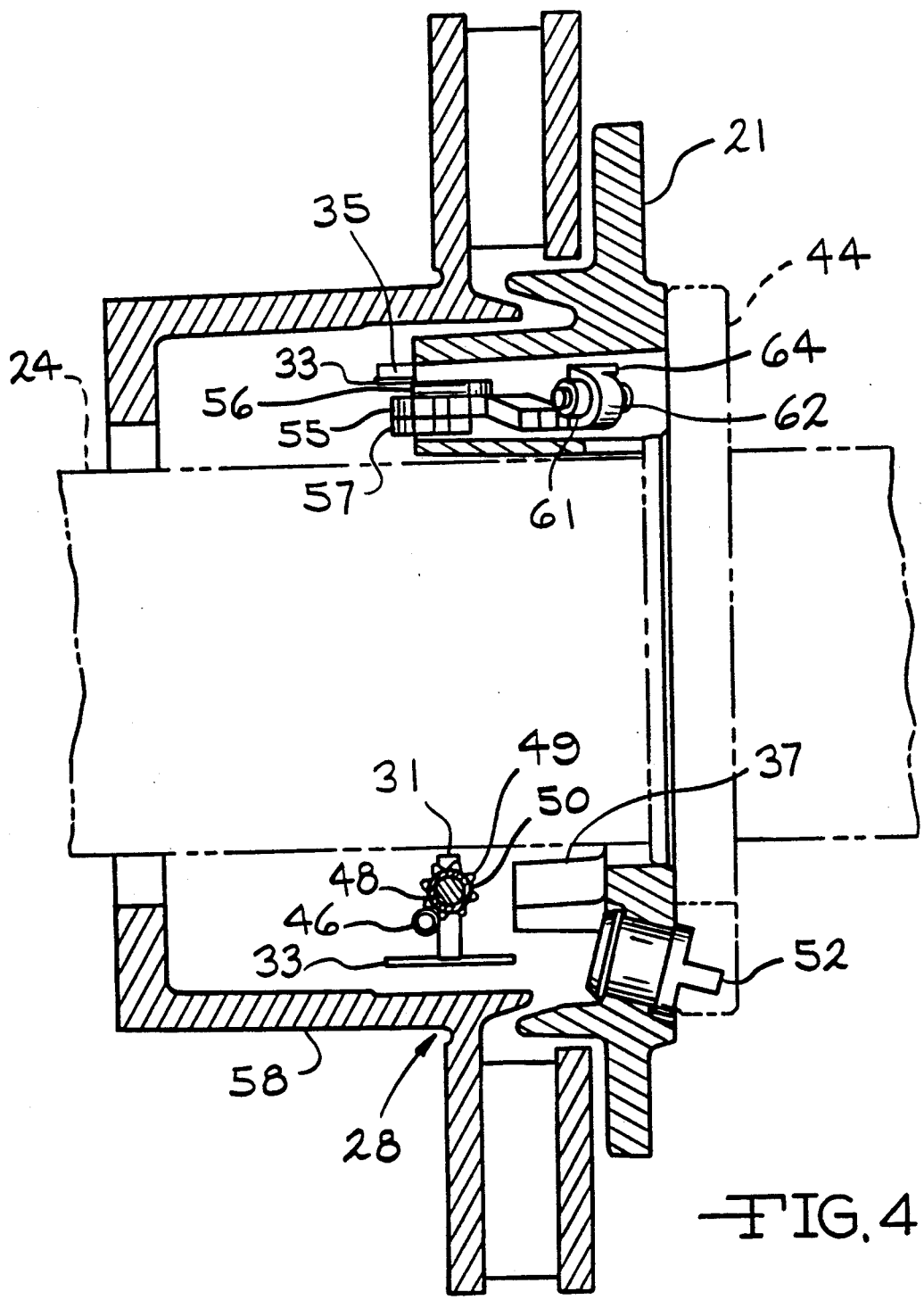
FIG. 4 is a sectional view taken along the line 4—4 of FIG. 1, including the disc brake rotor and showing my improved actuating mechanism for the brake shoes in full view.

With reference to the drawings, FIG. 1 shows an anchor plate casting 20 including an annular backing plate 21 and a pair of opposed arms 22 and 23. The casting 20 as shown is adapted for mounting on the left rear axle tube 24 of a heavy truck. The axle tube 24 is best shown in broken lines in FIG. 4 and in cross section in FIGS. 5, 9 and 11.

The outboard side of casting 20 is shown in FIG. 1. The backing plate 21 has a drum-in-hat parking brake assembly 25 mounted on the outboard side. At their outer ends, arms 22 and 23 respectively include a pair of guide rails 26 and 27 for mounting the caliper (not shown) of a disc brake having a hat-shape rotor 28 shown in FIGS. 3, 4, 5, 9 and 11.

The drum-in-hat parking brake 25 includes a pair of arcuate brake shoes 29 and 30 of generally T-shaped cross section and including flat arcuate webs 31 and 32 with arcuate tables 33 and 34 secured respectively to outer arcuate edges thereof. Arcuate friction pads 35 and 36 are attached respectively to tables 33 and 34.

The annular backing plate 21 typically includes a plurality of raised pads 37 on its outboard side. Tables 33 and 34 are typically held in position against the pads 37 in a manner well known in the art as by a pair of pins (not fully shown) having enlarged heads 38 (FIG. 2) and flattened, T-shaped, outboard ends 39 (FIG. 1A). From their heads 38 the pins pass through appropriate holes in backing plate 21 and in both legs of typical U-shaped spring clips 40. The hole in the outboard leg of each spring clip 40 comprises a slot 41 extending across the bottom and up both inclined sides of a transverse groove 42 in the outboard leg. The flattened end 39 of a respective pin is turned ninety degrees into alignment with the groove 42 after being inserted through slot 41. Engagement of the flattened end 39 with the inclined sides of the groove 42 prevents inadvertent turning of the flattened end 39 back into alignment with the slot 41.

Backing plate 21 is provided with a plurality of bolt holes 43 for the reception of mounting bolts (not shown) to secure the casting 20 in place with its inboard side against a mounting flange 44 (FIG. 4) on a typical axle tube 24. On its outboard face backing plate 21 is machined in a plurality of areas 45 around bolt holes 43 to provide smooth surfaces for engagement by the bolt heads.

Adjacent their lower ends as viewed in FIG. 1, the brake shoe webs 31 and 32 are provided with suitable openings for the reception respectively of opposite hooked ends of a tension spring 46. A typical duo-servo friction pad wear-adjusting strut 47 is provided between the lower ends of the webs 31 and 32, including a shaft 48, a star wheel 49 threadedly mounted on shaft 48, and a sleeve 50. An access hole 51 is provided in the backing plate 21 for external adjustment of star wheel 49. A plug 52 (FIGS. 2 and 4) typically closes the access hole 51.

Between the upper ends of the webs 31 and 32 as viewed in FIG. 1, the backing plate 21 is provided with a hollow, rotation-preventing abutment post 53 which prevents rotation of the brake shoes in either direction when the parking brake is actuated and also partially houses the mechanical actuating mechanism for brake shoes 29 and 30. Adjacent their upper ends webs 31 and 32 are provided with suitable openings for the reception respectively of opposite hooked ends of a tension return spring 54 which biases the upper ends of the webs toward each other and into engagement with the post 53. My improved parking brake mechanical actuating mechanism includes a pivotable operating lever 55 mounted between a pair of oppositely reciprocable link members 56 and 57. The return spring 54 biases webs 31 and 32 into engagement with the link members 56 and 57 and acts to configure the mechanism in its non-activated position.

Figure 5:
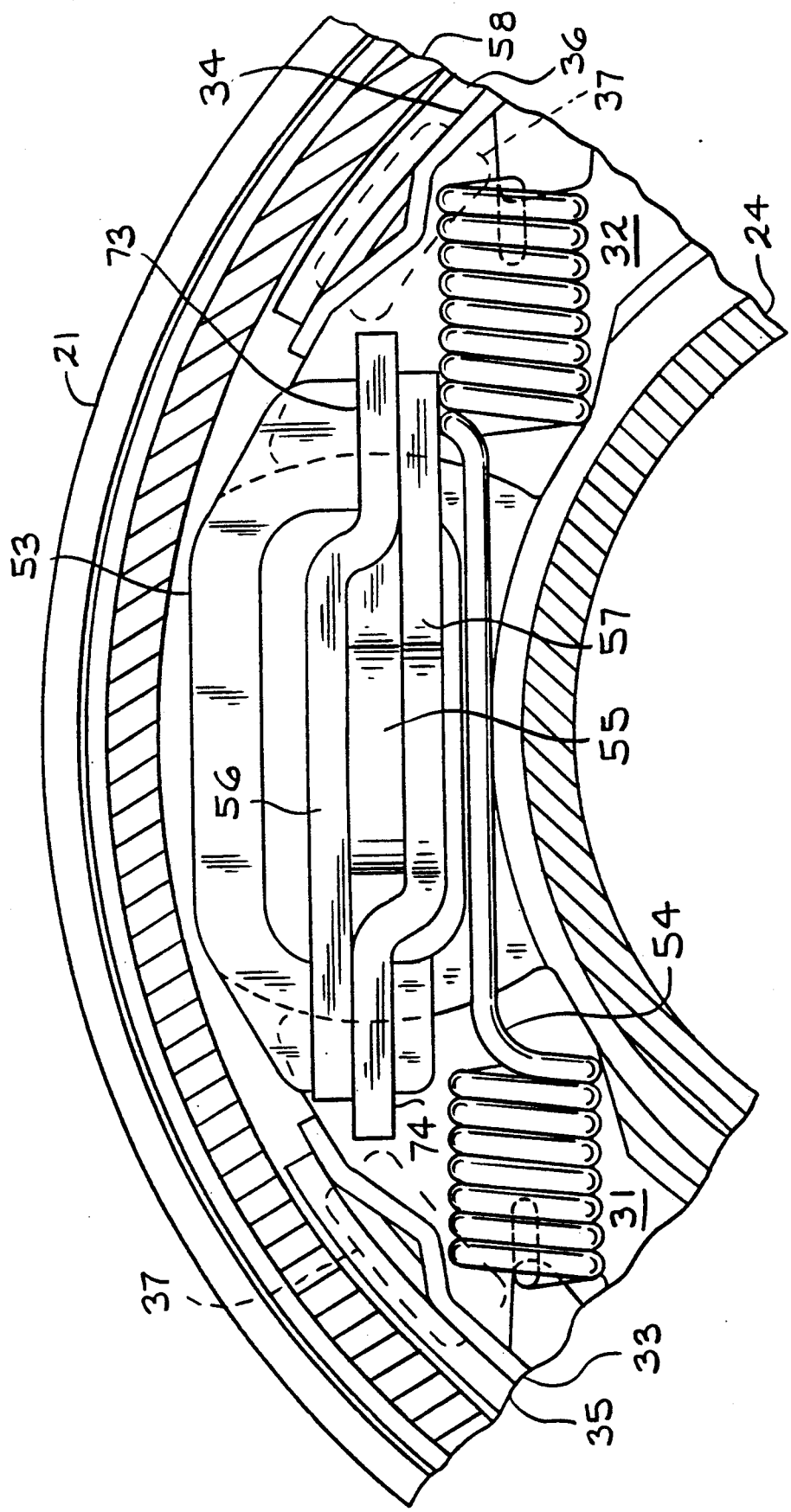
FIG. 5 is an enlarged view of the upper portion of FIG. 1, showing my improved actuating mechanism for the brake shoes of the drum-in-hat parking brake, including a fragmentary section of the disc brake rotor of the associated hydraulic disc brake and a fragmentary section of an axle tube of a heavy-duty truck.

FIG. 5 shows an enlarged view of an upper portion of FIG. 1 and illustrates how my improved actuating mechanism fits between the hat section 58 of disc brake rotor 28 and axle tube 24.

Figure 2:
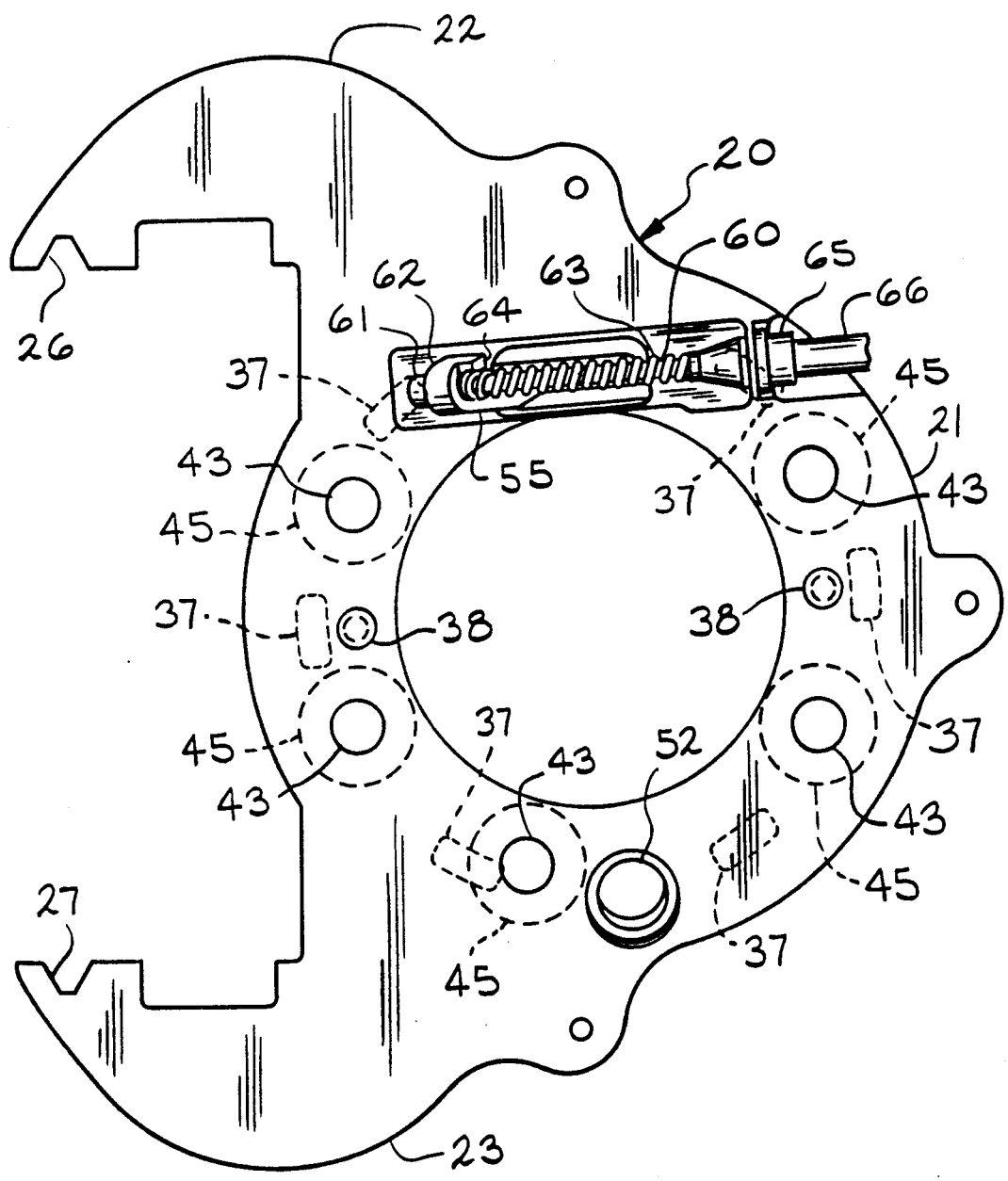
FIG. 2 is an inboard view of the support casting of FIG. 1.
Figure 3:
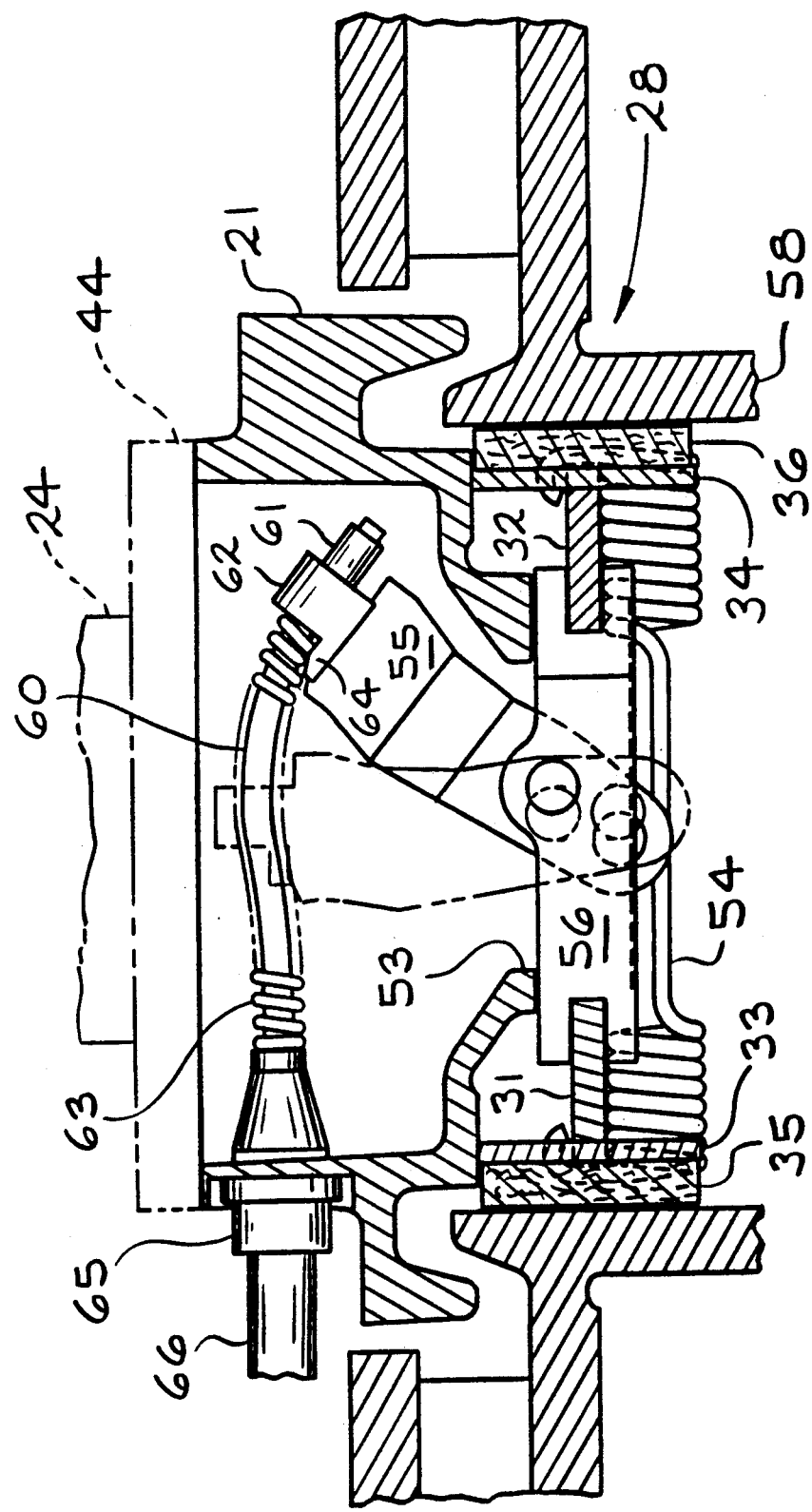
FIG. 3 is a sectional view taken along line 3—3 of FIG. 1, including a fragmentary section of the disc brake rotor of the associated hydraulic disc brake.

The cavity within abutment post 53 extends through backing plate 21 and is wider on the inboard side as can be seen in FIGS. 2 and 3, thereby forming a closed chamber with axle tube mounting flange 44 for the pivotable operating lever 55 free from the road environment. A cable 60 has an inner end provided with a stop 61 disposed on one side of a reversely curved inboard end portion 62 of the lever 55. A compression spring 63 encircling cable 60 is disposed on an opposite side of the reversely curved end portion 62. A tab 64 on the reversely curved end portion 62 aids in maintaining spring 63 in place. By this means, cable 60 is secured to the operating lever 55. An elastomeric seal 65 seals the opening in the side wall of backing plate 21 through which cable 60 passes, and a protective sheath 66 is provided on cable 60 outside of the backing plate 21.

Figure 6:
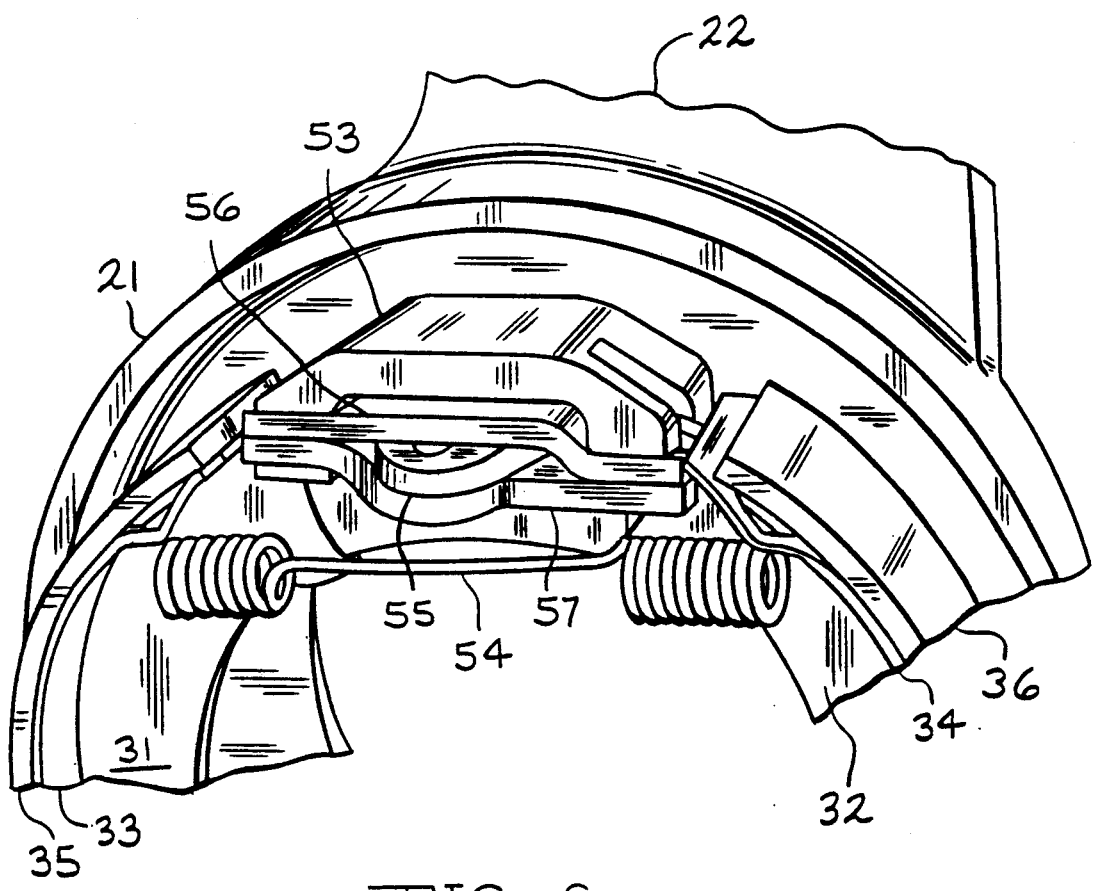
FIG. 6 is a fragmentary perspective view of the upper portion of FIG. 1, showing my improved actuating mechanism for the brake shoes.
Figure 7:
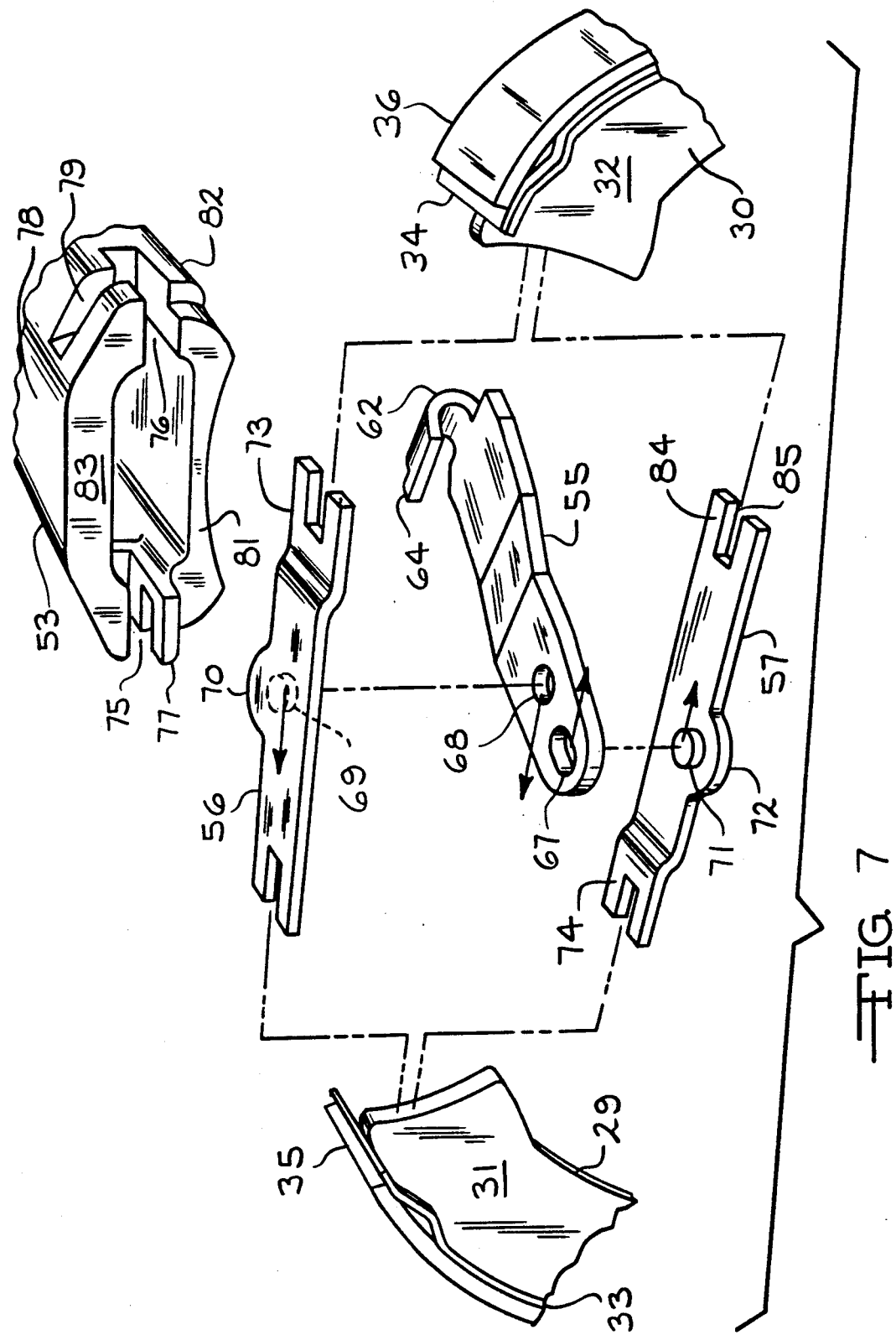
FIG. 7 is an exploded perspective view of my improved actuating mechanism.

FIGS. 6 and 7 more clearly show details of my improved mechanical actuating mechanism and the mounting thereof, particularly links 56 and 57, within abutment post 53. Each of the links 56 and 57 is slotted at opposite ends respectively to receive webs 31 and 32. As shown in FIG. 7, the outboard end of the lever 55 opposite the reversely curved inboard end 62 is provided with an oval hole 67 elongated longitudinally of the lever and a circular hole 68 spaced from hole 67 in a direction toward the reversely curved end 62. The upper link 56 is provided, on its lower surface, with a downwardly extending cylindrical stud or boss 69 concentric with an arcuate ear 70 on an inboard edge of the link and received in the hole 68 of lever 55. Similarly the lower link 57 is provided on its upper surface with an upwardly extending cylindrical stud or boss 71 concentric with arcuate ear 72 on the outboard edge of the link and received in hole 67 of the lever 55. A right-hand end 73 of link 56, as viewed in FIG. 7, is downwardly offset by one thickness, and the left-hand end 74 of link 57 is upwardly offset by one thickness. When the actuating mechanism is assembled, the offset ends 73 and 74 are aligned with the outboard end of the lever 55, as most clearly shown in FIGS. 5 and 6. In actual practice, lever 55 and links 56 and 57 are formed from material of the same thickness.

As shown in FIG. 7, the abutment post 53 is appropriately configured and slotted for reception of my improved mechanical actuating mechanism (lever 55 and links 56 and 57) and the upper portions of webs 31 and 32. Left-hand horizontal slot 75 is upwardly offset from the right-hand horizontal slot 76 for reception of the corresponding assembly of links 56 and 57, as shown in FIGS. 5 and 6. The left-hand end 74 of the link 57 is supported by slotted shelf 77. An upper portion 78 of the abutment post 53 is slotted on the right-hand side at 79 for reception of brake shoe web 32. A similar slot 80 (FIGS. 8 and 10) is provided on the left-hand side of the portion 78 for reception of brake shoe web 31. An outboard face 81 on the lower portion 82 of abutment post 53 is recessed inwardly with respect to the outboard face 83 on the upper portion 78, and therefore a right-hand end portion 84 of link 57 is supported from an inboard edge of the link to an outboard edge of slot 85. When assembled, links 56 and 57 are held in slots 75 and 76 by webs 31 and 32, but are free to move longitudinally by action of operating lever 55.

Figure 8:
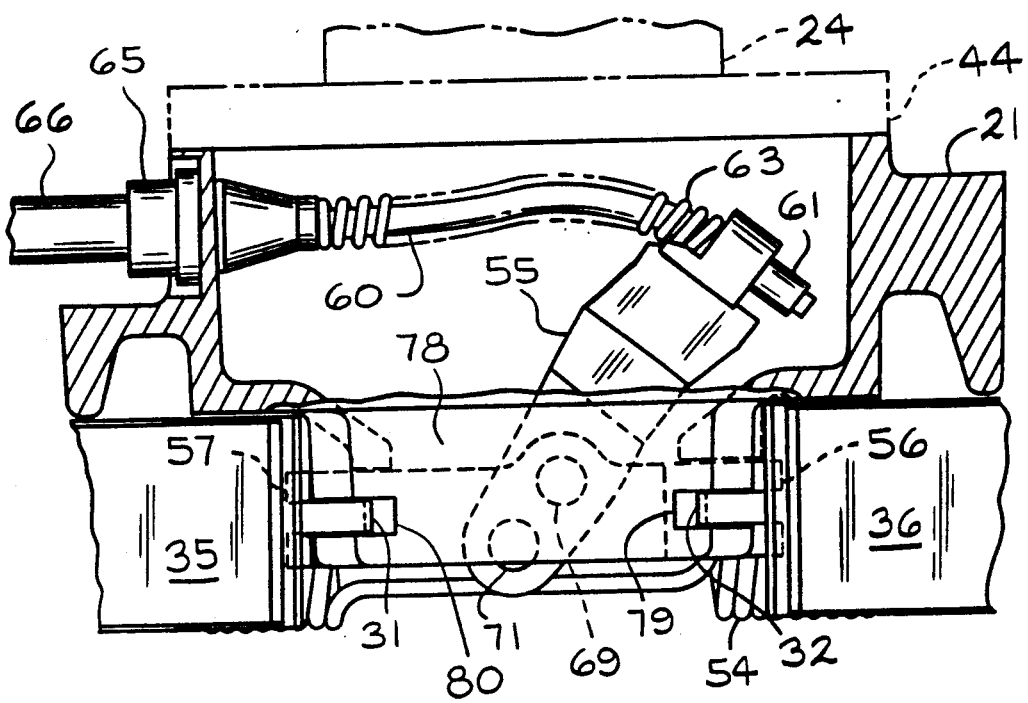
FIGS. 8 and 9 are views similar to FIGS. 3 and 5, respectively, showing my improved actuating mechanism in an OFF or disengaged condition.
Figure 9:
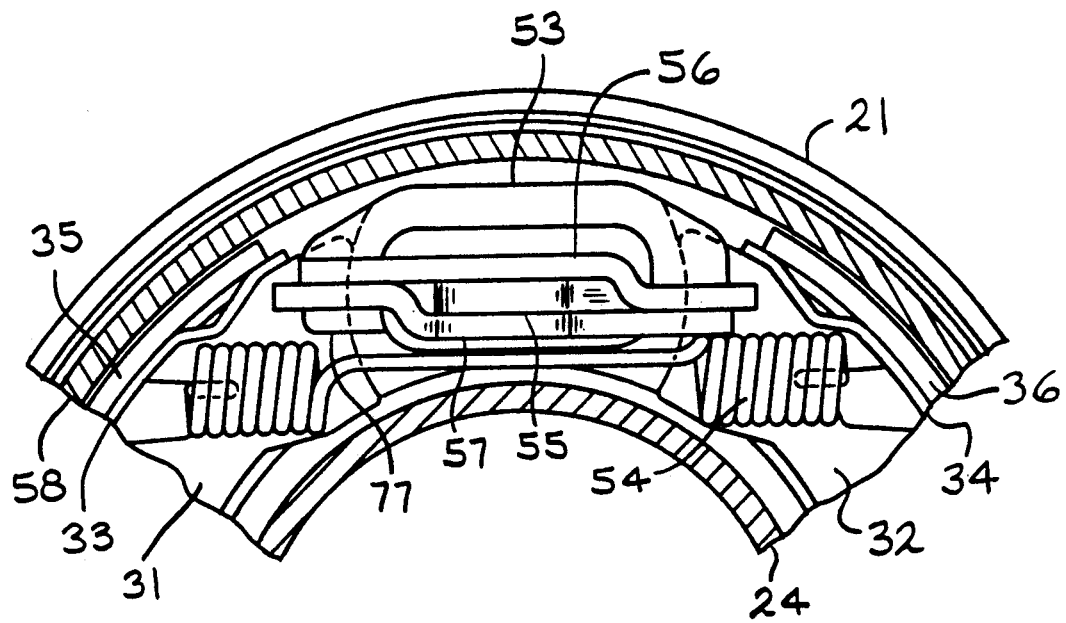

FIGS. 8 and 9 show an OFF or disengaged condition of my mechanical parking brake mechanism. FIG. 8 is similar to FIG. 3, but in FIG. 8 the abutment post 53 is not sectioned and its upper portion 78 is visible. In FIG. 8 the operating lever 55 is biased toward the right by action of compression spring 63, and stud 69 is positioned to the right of boss 71. In FIG. 9 the friction pads 35 and 36 are spaced from the inner cylindrical surface of the disc brake rotor and hat 58, web portions 31 and 32 are in contact with abutment post 53 and spring 54 is fully contracted.

Figure 10:
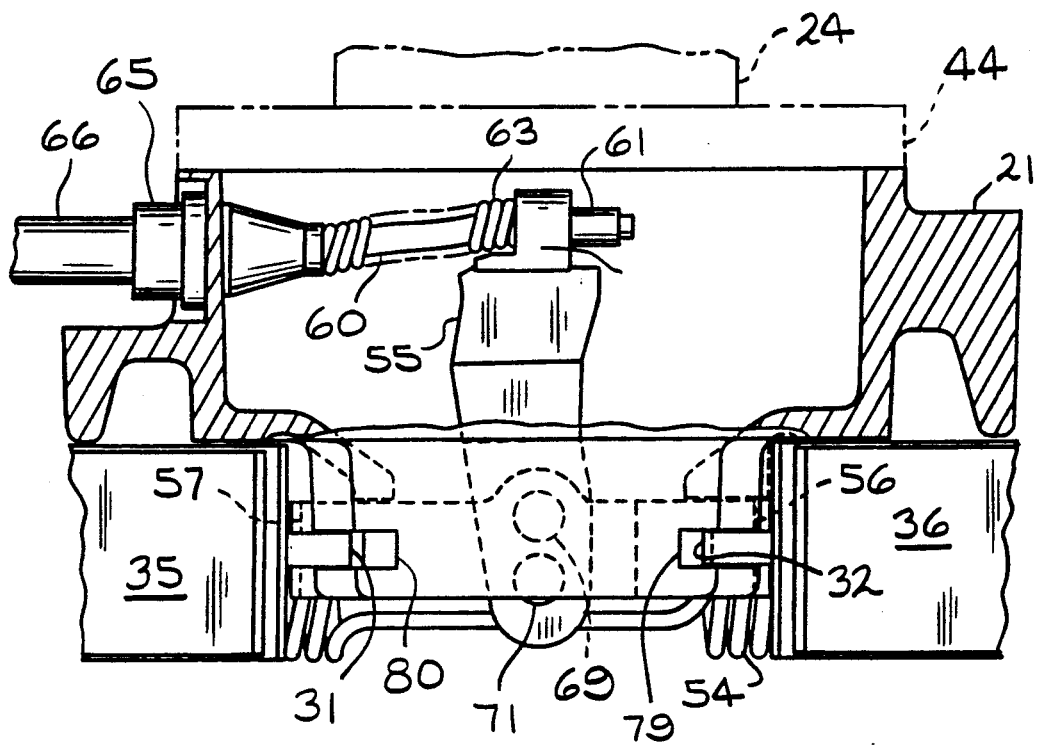
FIGS. 10 and 11 are views similar FIGS. 8 and 9, respectively, showing my improved actuating mechanism in an ON or engaged condition.
Figure 11:
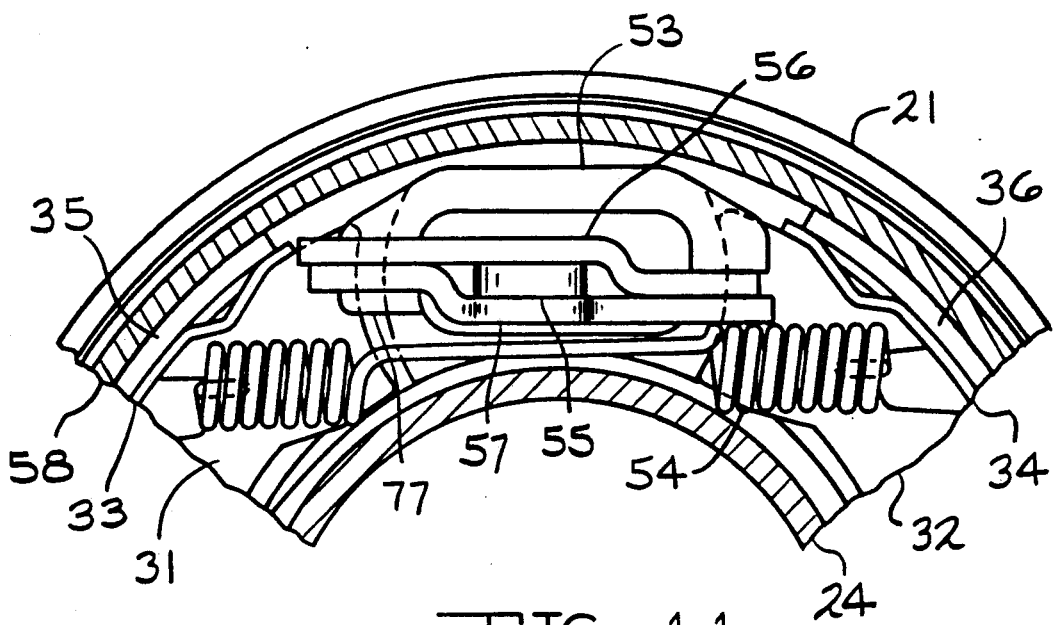

FIGS. 10 and 11 show the ON or engaged condition of my mechanical parking brake mechanism when the parking brake is applied. In FIG. 10 operating lever 55 has been pivoted counterclockwise from its position in FIG. 8 by actuation of cable 60; stud 69 is now substantially vertical above boss 71. Thus link 56 has moved toward the left from its position in FIGS. 8 and 9 and link 57 has moved toward the right, thereby urging friction pads 35 and 36 into frictional engagement with the inner cylindrical surface of hat 58, as shown in FIG. 11, thereby stretching spring 54.

Various modifications may be made in the structure shown and described without departing from the spirit and scope of the invention.

The invention is claimed as follows:

1. In a drum type mechanical parking brake assembly having a backing plate, a central opening therein for passage of an axle, a pair of opposed arcuate brake shoes mounted on an outboard side of said backing plate each having a web with an arcuate outer edge and an arcuate table secured to said outer edge of said web, and a pair of friction pads secured to said tables, the improvement comprising a hollow, rotation-preventing abutment post disposed upon said backing plate between adjacent ends of said brake shoe webs, said abutment post forming a chamber extending inboard through said backing plate and having means for engagement respectively therein of said brake shoe webs, a generally flat elongated upper link and a generally flat elongated lower link in flatwise partially contiguous relationship, said upper link having an offset end and said lower link having an offset end opposite from said offset end of said upper link lengthwise of said links whereby intermediate portions of said links are spaced apart, an outboard face of said abutment post having slots for reception respectively therein of opposite ends of said links and said opposite ends of the links having slots for reception respectively therein of said brake shoe webs, a pivotable operating lever disposed in said chamber having a cable attacked to an inboard end thereof and having an outboard end disposed in a space between said intermediate portions of the links, a hat-shaped disc brake rotor concentrically associated with said backing plate on an outboard side thereof and including a hat engageable on an inner cylindrical surface by said friction pads, said links being operatively connected to said lever respectively at points spaced along said lever whereby pivotably movement of said lever by said cable effects lengthwise extension of said links in opposite direction thereby urging said friction pads into frictional engagement with said hat.

2. A drum-in-hat parking brake assembly for a hydraulic disc brake comprising:
 a one-piece casting including a backing plate for securing said casting to a vehicle axle tube and a hollow abutment block cast integrally with said backing plate;
 a pair of arcuate drum brake shoes supported relative to said backing plate;
 said hollow abutment block located on said backing plate between a pair of adjacent ends of said brake shoes, and defining a chamber and a pair of opposed slots extending from said chamber through opposite ends of said abutment block; and
 an operating lever mechanism at least partially disposed in said chamber and including a pair of links extending in opposite directions through said slots, and a pivotable operating lever coupled to effect lengthwise movement of said links in opposite directions to engage and actuate said brake shoes.

3. The brake assembly defined in claim 2 wherein each of said links includes an offset end and said offset end of one of said links is positioned adjacent a non-offset end of the other of said links, whereby intermediate portions of said links are spaced apart for the reception of an outboard end of said operating lever between said links, and adjacent ends of said links are contiguous.

4. The brake assembly defined in claim 3 wherein said outboard end of said lever has two holes spaced lengthwise of said lever, at least one of said holes being elongated lengthwise of said operating lever, and each of said links provided with a cylindrical boss disposed in a respective one of said holes.

5. The brake assembly defined in claim 3 wherein each of said brake shoes includes an arcuate web and opposite ends of each of said links are slotted to receive said webs of said brake shoes.

6. The brake assembly according to claim 2 and further including a cable coupled to actuate said operating lever.

7. The brake assembly according to claim 2 wherein said casting includes a pair of spaced arms extending from said backing plate and providing caliper guide rails.

8. The brake assembly according to claim 2 and including a hat-shaped disc rotor having a central opening therein for receiving the axle tube.

9. An operating mechanism for a pair of opposed arcuate brake shoes each including an arcuate web, said mechanism comprising a pair of juxtaposed elongated links disposed between said brake shoes, one of said links including a first slotted end for receiving said web of one of said brake shoes and including an opposite second slotted end for receiving said web of the other one of said brake shoes and the other one of said links including at least a first slotted end for receiving said web of said one of said brake shoes, and an actuating means operatively connected to said links for effecting lengthwise movement of said links in opposite directions to cause outward movement of said brake shoes, said first and second slotted ends of said one of said links and said first slotted end of said other one of said links cooperating with said webs to retain said links in operative engagement with said brake shoes.

10. The operating mechanism as claimed in claim 9 wherein said other one of said links includes an opposite second slotted end for receiving said web of said other one of said brake shoes.

11. The operating mechanism as claimed in claim 10 wherein said actuating means is a pivotable lever and said links are operatively connected to said lever at points spaced along said lever.

12. The operating mechanism as claimed in claim 11 wherein said lever includes an end provided with two holes spaced lengthwise along said lever, at least one of said holes being elongated lengthwise of said lever, and each of said links includes a cylindrical boss disposed in one of said holes.

* * * * *